United States Patent
Dauvin (10) Patent No.: US 11,627,374 B2
(45) Date of Patent: Apr. 11, 2023

(54) METHOD OF MONITORING USAGE OF AT LEAST ONE APPLICATION EXECUTED WITHIN AN OPERATING SYSTEM, CORRESPONDING APPARATUS, COMPUTER PROGRAM PRODUCT AND COMPUTER-READABLE CARRIER MEDIUM

(71) Applicant: Thomson Licensing, Cesson-Sevigne (FR)

(72) Inventor: Laurent Dauvin, Cesson-Sevigne (FR)

(73) Assignee: Thomson Licensing, Cesson-Sevigne (FR)

( * ) Notice: Subject to any disclaimer, the term of this patent is extended or adjusted under 35 U.S.C. 154(b) by 0 days.

(21) Appl. No.: 17/601,446

(22) PCT Filed: Mar. 30, 2020

(86) PCT No.: PCT/EP2020/059004
§ 371 (c)(1),
(2) Date: Oct. 5, 2021

(87) PCT Pub. No.: WO2020/216580
PCT Pub. Date: Oct. 29, 2020

(65) Prior Publication Data
US 2022/0224979 A1 Jul. 14, 2022

(30) Foreign Application Priority Data
Apr. 25, 2019 (EP) .................................... 19171223

(51) Int. Cl.
*H04N 21/442* (2011.01)
*H04N 21/433* (2011.01)
*H04N 21/443* (2011.01)

(52) U.S. Cl.
CPC ..... *H04N 21/4424* (2013.01); *H04N 21/4333* (2013.01); *H04N 21/4431* (2013.01); *H04N 21/44227* (2013.01)

(58) Field of Classification Search
None
See application file for complete search history.

(56) References Cited

U.S. PATENT DOCUMENTS 10,075,775 B2 * 9/2018 Cain .................... H04N 21/434
2005/0283800 A1 * 12/2005 Ellis ....................... H04N 21/47
348/E5.122

(Continued)

FOREIGN PATENT DOCUMENTS

| CN | 107920245 A | 4/2018 |
| WO | 2010131259 A2 | 11/2010 |
| WO | 2016073521 A1 | 5/2016 |

OTHER PUBLICATIONS

Quiroli, Lorenzo "Show App Usage with UsageStatsManager", URL:https://medium.com/@quiro91/show-app-usage-with-usagestatsmanager-d47294537dab Dec. 23, 2016.

*Primary Examiner* — Junior O Mendoza
(74) *Attorney, Agent, or Firm* — Vincent Edward Duffy (57) ABSTRACT

The disclosure relates to a method for monitoring usage of at least one application executed within an operating system of an electronic device. The method includes at least one iteration of, while a processing condition is not satisfied, determining a video event associated with a current application and storing the video event in a data structure, delivering a set of video events. The method further includes, once the processing condition is satisfied, determining a past time slot, calling an usage statistics API provided on the operating system, delivering a set of application events representative of whether an application has been put in system foreground or system background, (Continued)

retrieving application events that have occurred during the past time slot, retrieving video events that have occurred during the past time slot, and chronologically ordering the retrieved application and video events, delivering a consolidated set of ordered events.

13 Claims, 4 Drawing Sheets

(56) References Cited

U.S. PATENT DOCUMENTS

| | | |
|---|---|---|
| 2015/0127819 A1 | 5/2015 | Cimino et al. |
| 2018/0159944 A1* | 6/2018 | Frank .................... H04L 67/535 |
| 2020/0021885 A1* | 1/2020 | Li ..................... H04N 21/64322 |

* cited by examiner

```
t301 – App3 – APP_START
t320 – App3 – APP_START
t352 – App3 –APP_STOP
t354 – App3 –APP_STOP
t355 – App3 – APP_STOP
t356 – App2 – APP_START
t366 – App2 – APP_STOP
t367 – App4 – APP_START
t427 – App4 – VIDEO_START
t429 – App4 – VIDEO_START
t430 – App4 – VIDEO_START
t747 – App4 – VIDEO_STOP
t748 – App4 – VIDEO_STOP
t750 – App4 – APP_STOP
t752 – App3 – APP_START
t754 – App3 - APP_STOP
t755 – App2 – APP_START
t757 – App2 – APP_STOP
```

310, 310, 310, 340, 310, 310, 310, 320, 330

```
t301 – App3 – APP_START
t320 – App3 – APP_START
t352 – App3 –APP_STOP
t354 – App3 –APP_STOP
t355 – App3 – APP_STOP
t356 – App2 – APP_START
t366 – App2 – APP_STOP
t367 – App4 – APP_START
t427 – App4 – VIDEO_START
t429 – App4 – VIDEO_START
t430 – App4 – VIDEO_START
t747 – App4 – VIDEO_STOP
t748 – App4 – VIDEO_STOP
t750 – App4 – APP_STOP
t752 – App3 – APP_START
t754 – App3 – APP_STOP
t755 – App2 – APP_START – VOICE_ACTIVATED
t757 – App2 – APP_STOP
```

32

```
t301 – App3 – APP_START
t352 – App3 –APP_STOP
t356 – App2 – APP_START
t366 – App2 – APP_STOP
t367 – App4 – APP_START
t427 – App4 – VIDEO_START
t747 – App4 – VIDEO_STOP
t750 – App4 – APP_STOP
t755 – App2 – APP_START – VOICE_ACTIVATED
t757 – App2 – APP_STOP
```

METHOD OF MONITORING USAGE OF AT LEAST ONE APPLICATION EXECUTED WITHIN AN OPERATING SYSTEM, CORRESPONDING APPARATUS, COMPUTER PROGRAM PRODUCT AND COMPUTER-READABLE CARRIER MEDIUM

This application claims the benefit, under 35 U.S.C. § 365 of International Application PCT/EP2020/059004, filed Mar. 30, 2020, which was published in accordance with PCT Article 21(2) on Oct. 29, 2020, in English and which further claims the benefit of priority application EP19171223.1, filed on Apr. 25, 2019.

1. FIELD OF THE DISCLOSURE

The present invention relates generally to the field of data analytics. More particularly, the present disclosure relates to a method for monitoring usage of applications executed within an operating system of an electronic device.

2. BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Gathering customer information from the field is crucial for operators—such as Internet service providers or phone operators—to be proactive and enhance customer experience. More particularly, it is of interest for an operator to collect information regarding which applications are mainly used on an electronic device (a smartphone or a set-top box for example), how long they are used, and how they are used. Such data must be anonymized, but still information can be inferred in a larger scale.

Obtaining such information, however, usually turns out to be quite difficult.

Indeed, although some applications may implement in their own code their own analytics solutions to allow a user to monitor their usage, no direct information is usually made available outside these applications. In addition, many applications do not implement such analytics solution at all. Furthermore, the operators usually don't have control on the applications that are installed on an electronic device.

Some operating systems provide means for obtaining some information regarding applications usage. However, information obtained is usually fragmented and limited. For example, Android® operating system provides a native usage statistics Application Programming Interface (API), that can be called to obtain a history regarding whether applications have been put in system foreground or in system background, with corresponding timestamps. Yet, no information regarding how an application is used can be directly inferred from such an API. For example, considering an application delivering video contents, it would be of interest to differentiate the time really dedicated to watch videos versus the time spent to browse the video catalogue provided by the application.

It would hence be desirable to provide a technique that would avoid at least some of these drawbacks of the prior art, and that would notably allow monitoring applications in a more accurate way.

3. SUMMARY

According to the present disclosure, a method for monitoring usage of at least one application executed within an operating system of an electronic device is disclosed. Such a method is implemented by a monitoring application different from said at least one application, and it comprises at least one iteration of:
  while a processing condition is not satisfied:
    determining a video event associated with a current application;
    storing said video event along with a corresponding video event timestamp in a data structure, delivering a set of video events;
  once said processing condition is satisfied:
    determining a past time slot;
    calling an usage statistics API provided on said operating system, delivering a set of application events representative of whether an application has been put:
      in system foreground, defining an application start event; or
      in system background, defining an application stop event; each application event being associated with a corresponding application event timestamp;
    retrieving, from said set of application events and based on the application event timestamps, application events that have occurred during said past time slot;
    retrieving, from said set of video events and based on the video event timestamps, video events that have occurred during said past time slot;
    chronologically ordering said retrieved application and video events, based on said application and video event timestamps, delivering a consolidated set of ordered events that have occurred during said past time slot.

According to an embodiment, determining a video event associated with a current application comprises:
  identifying said current application via a call to said usage statistics API, said current application corresponding to the last application logged as being put in system foreground in said usage statistics;
  determining said video event, as a function of a previous video event associated with said current application, of a current audio status, and of a current network usage status.

According to an embodiment, said previous video event associated with said current application is retrieved from said set of video events.

According to an embodiment, said current audio status and/or said current network usage status are obtained via a call to at least one API provided by said operating system.

According to an alternative embodiment, said current audio status and/or said current network usage status are obtained by monitoring at least one equipment of said electronic device.

According to an embodiment, said video event is either a video start event or a video stop event, and:
  said video event is a video start event, when the following conditions are met:
    said previous video event is a video stop event; and
    said current audio status is active; and
    said network current network usage status is active;

said video event is a video stop event, when the following conditions are met:
 said previous video event is a video start event; and
 said current audio status is not active.

According to an embodiment, the proposed method further comprises removing successive duplicated events of a same type from said consolidated set of ordered events.

According to an embodiment, the proposed method further comprises removing, from said consolidated set of ordered events:
 successive duplicated pairs formed by an application start event and an application stop event;
 successive duplicated pairs formed by a video start event and a video stop event.

According to an embodiment, the proposed method further comprises removing a pair formed by an application start event and an application stop event from said consolidated set of ordered events, when the following conditions are met:
 time duration separating said application start event and said application stop event is below a predetermined threshold;
 application associated with said pair of events is absent from a predetermined list of applications.

According to a particular feature of this embodiment, the method further comprises adding a flag to a pair formed by an application start event and an application stop event within said consolidated set of ordered events, when the following conditions are met:
 time duration separating said application start event and said application stop event is below said predetermined threshold;
 application associated with said pair of events is present within said predetermined list of applications.

According to an embodiment, said monitoring application is a system application executed in the system background.

According to an embodiment, said operating system is an Android operating system.

The present disclosure also concerns an apparatus for monitoring usage of at least one application executed within an operating system of an electronic device, wherein the apparatus comprises at least one processor adapted and configured for:
 while a processing condition is not satisfied:
  determining a video event associated with a current application;
  storing said video event along with a corresponding video event timestamp in a data structure, delivering a set of video events;
 once said processing condition is satisfied:
  determining a past time slot;
  calling an usage statistics API provided on said operating system, delivering a set of application events representative of whether an application has been put:
   in system foreground, defining an application start event; or
   in system background, defining an application stop event;
  each application event being associated with a corresponding application event timestamp;
   retrieving, from said set of application events and based on the application event timestamps, application events that have occurred during said past time slot;
   retrieving, from said set of video events and based on the video event timestamps, video events that have occurred during said past time slot;
   chronologically ordering said retrieved application and video events, based on said application and video event timestamps, delivering a consolidated set of ordered events that have occurred during said past time slot.

According to one implementation, the different steps of the method for monitoring usage of at least one application as described here above are implemented by one or more software programs or software module programs comprising software instructions intended for execution by a data processor of an apparatus for monitoring usage of at least one application executed within an operating system of an electronic device, these software instructions being designed to command the execution of the different steps of the methods according to the present principles.

A computer program is also disclosed that is capable of being executed by a computer or by a data processor, this program comprising instructions to command the execution of the steps of a method for monitoring usage of at least one application executed within an operating system of an electronic device, as mentioned here above.

This program can use any programming language whatsoever and be in the form of source code, object code or intermediate code between source code and object code, such as in a partially compiled form or any other desirable form whatsoever.

The information carrier can be any entity or apparatus whatsoever capable of storing the program. For example, the carrier can comprise a storage means such as a ROM, for example a CD ROM or a microelectronic circuit ROM or a magnetic recording means, for example a floppy disk or a hard disk drive.

Again, the information carrier can be a transmissible carrier such as an electrical or optical signal which can be conveyed via an electrical or optical cable, by radio or by other means. The program according to the present principles can be especially uploaded to an Internet type network.

As an alternative, the information carrier can be an integrated circuit into which the program is incorporated, the circuit being adapted to executing or to being used in the execution of the methods in question.

According to one embodiment, the methods/apparatus may be implemented by means of software and/or hardware components. In this respect, the term "module" or "unit" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, etc.) and is capable of accessing hardware resources of this physical entity (memories, recording media, communications buses, input/output electronic boards, user interfaces, etc.).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

A non-transitory processor readable medium having stored thereon such a program is also disclosed.

It is to be understood that both the foregoing general description and the following detailed description are exemplary and explanatory and are not restrictive of the disclosure, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

4. BRIEF DESCRIPTION OF THE DRAWINGS

Embodiments of the present disclosure can be better understood with reference to the following description and drawings, given by way of example and not limiting the scope of protection, and in which.

The components in the figures are not necessarily to scale, emphasis instead being placed upon illustrating the principles of the disclosure.

5. DETAILED DESCRIPTION

The present disclosure relates to a method that allows monitoring usage of applications executed within an operating system of an electronic device. The method is implemented by a monitoring application different from the applications to monitor, and aims at providing not only information regarding applications usage time, but also information regarding how some of the monitored applications are used. By monitoring, it is thus understood here to provide a way to detect some usage of the applications executed within the operating system, from outside these applications. More particularly, the proposed technique is directed towards determining application usage time (i.e. detecting when an application is opened and closed), and, as for applications allowing to play video (such as YouTube, Netflix, etc.) the time dedicated to watch video versus the time dedicated to browse a video catalogue. In one embodiment, as it will be described later in the document, the proposed technique also allows detecting when a search engine is used, and whether it is used to perform a text search or a vocal search.

As it will be described more fully hereafter with reference to the accompanying figures, it is proposed in one aspect of the present disclosure to obtain on one hand a set of video events occurring in the monitored applications, by crossing various available data, and on the other hand a set of application events, by calling a usage statistics API provided on the operating system. The set of video events and the set of application events are then merged under certain conditions, so as to deliver a consolidated set of ordered events providing valuable information regarding when, how long and how applications have been used on the electronic device. In the context of the disclosure, the usage statistics API returns information regarding whether an application has been put in system foreground or in system background. Since statistics update is not a crucial point in the global system life cycle, it is usually one of the last core processes to be allowed to use resources of the electronic device in order to execute. Thus, the set of application events provided by the usage statistics API may not be up to date in real time. Conversely, the set of video event has to be built progressively, in almost real time, by analysing periodically (e.g. every second) the electronic device activity, since no API gives access to video statistics in the context of the disclosure. According to the general principle of the disclosure, to reconcile these two issues, it is proposed to delay the previously described merge processing over the time so as to give the system the necessary time to update usage statistics, and to perform the merge as a function of a given time slot in the past, so as to ensure that the data obtained through the usage statistics API are complete for that given timeslot when the API is called.

This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the scope of the disclosure as defined by the claims. In the drawings, like or similar elements are designated with identical reference signs throughout the several views thereof.

While not explicitly described, the present embodiments and variants may be employed in any combination or sub-combination.

Figure 1:
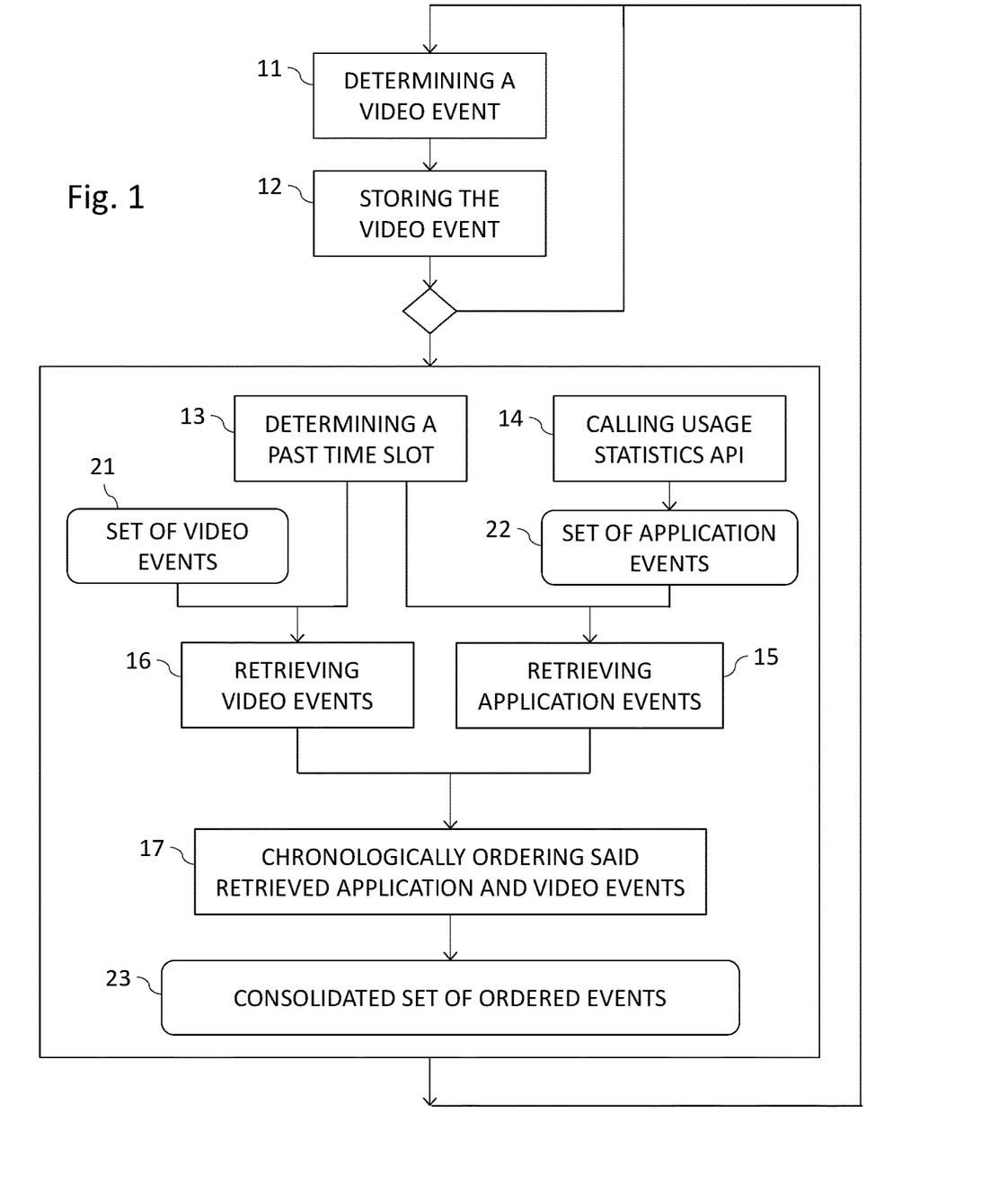
FIG. 1 is a flow chart for illustrating the general principle of the proposed technique for monitoring usage of at least one application executed within an operating system of an electronic device, according to an embodiment of the present disclosure.

FIG. 1 is a flow chart for explaining a method for monitoring usage of at least one application executed within an operating system of an electronic device, according to an embodiment of the present disclosure. According to a particular feature, the method is implemented by a monitoring application which takes the form of a system application running at the top level of the operating system, as a background service. The electronic device may be any device embedding an operating system, such as for example a smartphone, a tablet, a computer, a set-top box, etc. The operating system (e.g. Windows, MacOS, Android, 10S, etc.) provides an environment allowing various applications to be executed on the electronic device. These applications may be pre-installed applications, or applications installed by the user of the electronic device after its purchase.

In a first phase, two steps—step 11 for determining a video event associated with a current application, and step 12 for storing said video event in a data structure—are carried out on a recurring time basis, for example every second, while a processing condition is not satisfied. In that way, a set of video events is progressively build, almost in real time. Steps 11 and 12 are further detailed hereafter.

At step 11, a video event associated with a current application is determined. In one embodiment, such a video event is either a video start event (i.e. a video has just been launched in the current application) or a video stop event (i.e. a video has just been stopped in the current application). In other words, a video event is representative of a change of video status (from video stop to video's playing, or from video's playing to video stop). The current application is the application being in system foreground when step 11 is executed. In an embodiment, the current application is identified via a call to the usage statistics API provided by the operating system. The current application then corresponds to the last application logged as being put in system foreground (but not logged as being put in system background) in the results delivered by the call to said usage statistics API. A video event associated with the current application is then determined as a function of a previous video event associated with said current application, of a current audio status, and of a current network usage status.

More particularly, according to one embodiment:

a video event is identified as a video start event, when all the following conditions are met: the previous video event associated with the current application is a video stop event, the current audio status is active, and the current network usage status is active (that is, as described later in the document, that the use of the network has been continuous during at least a predetermined amount of time);

a video event is identified as a video stop event, when all the following conditions are met: the previous video event associated with the current application is a video start event, and the current audio status is not active.

In one embodiment, the previous video event associated with the current application is retrieved from the set of video events delivered at the end of the previous iteration of step 11 and 12 (a default value may be used if the set of video events does not yet contain any video event associated with the current application: for example, in that case, the previous video event may be considered as being a video stop event).

Determining whether an audio stream is currently played or not on the electronic device and determining application network usage over the time can be performed in several ways. According to an embodiment, some Application Programming Interfaces (different from the usage statistics API) provided within the operating system are used to obtain this information. For example, an API may be called to determine if the current application is using the network. More particularly, such an API may be called periodically, so that it can be determined whether the time of current use of the network by the current application is above a predetermined threshold or not. If the threshold is reached (for example, the threshold is set to ten seconds, and it is determined that the current application has used the network for the last eleven seconds), the current network usage status is considered as active. Otherwise, the current network usage status is considered as inactive. This makes it possible to more precisely differentiate true video streaming usage (which is usually characterized by heavily use of the network) from other usages (such as the progressive loading of the video catalogue when browsing by the user, if the audio is also active for some reason, for example) which should not be interpreted as video playback. Same or similar mechanisms may be implemented to determine whether the current audio status is considered as active not. For example, the current audio status is considered as active if an audio stream is currently played on the electronic device, and as inactive if no sound has been played during the last ten seconds. According to another embodiment, instead of using API, current network usage status and/or current audio status may be obtained by monitoring directly specific equipment of the electronic device, by means of dedicated probes. For example, monitoring a sound card and/or a network interface of the electronic device may allow inferring respectively a current audio status and/or a current network usage status.

Such crossing of information as previously described makes it possible to infer some application usage that could not have been detecting by using only one metric. For example, when a video is streamed, it is downloaded chunk by chunk when needed over time. Network use is thus not constant. However audio is constantly used, so crossing network usage information with audio information allows detecting whether a video is being streamed or not. Additionally, further crossing this information with an application usage makes it possible to determine which application is currently streaming a video.

At step 12, the determined video event is stored within a data structure (for example a database associated with the monitoring application) along with a corresponding video event timestamp. In one embodiment, the name of the current application is also associated with the determined event in the data structure.

As previously explained, steps 11 for determining a video event associated with a current application and step 12 for storing said video event in a data structure are carried out on a recurring time basis, for example every second, while a processing condition is not satisfied. Such processing condition may be satisfied when a given number of video events has been stored in the set of video events 21, when a given time has elapsed, or when a given number of iterations of step 11 and 12 has been performed. For example, the processing condition may be satisfied every ten seconds.

Once the processing condition is satisfied, a second phase, which may be referred to as a processing phase or as a consolidation phase, is carried out.

At step 13, a past time slot is determined. In one embodiment, the past time slot is defined as a function of the current time and of the frequency at which the second phase is carried out. For example, if the processing condition is satisfied every ten seconds, the past time slot may by defined by the time interval starting at "current time—20 seconds" and ending at "current time—10 seconds" (i.e. it starts at "current time minus twice the period at which the second phase is carried out" and ends at "current time minus the period at which the second phase is carried out").

At step 14, a call to the usage statistics API provided on the operating system is performed. This call returns a set of application events 22 representative of whether an application has been put in system foreground (which is considered, in the context of the disclosure, as an application start event) or in system background (which is considered, in the context of the disclosure, as an application stop event). Each application event is associated with a corresponding application event time stamp.

At step 15, the application events that have occurred during the past time slot determined at step 13 are retrieved from said set of application events, based on the application event time stamps. The past time slot is sufficiently far in the past so that usage statics returned by the usage statistics API are up to date on this interval.

The set of video events 21 previously built through the repeated iterations of step 11 and 12 is processed in a similar way: at step 16, the video events that have occurred during the past time slot determined at set 13 are retrieved from said set of video events 21, based on the video event time stamps.

The application events retrieved at step 15 and the video events retrieved at step 16 are then gathered and chronologically ordered, based on the application events timestamps and on the video event timestamps, so as to deliver a consolidated set of ordered events 23 that have occurred during the past time slot determined at step 13.

Figure 2:
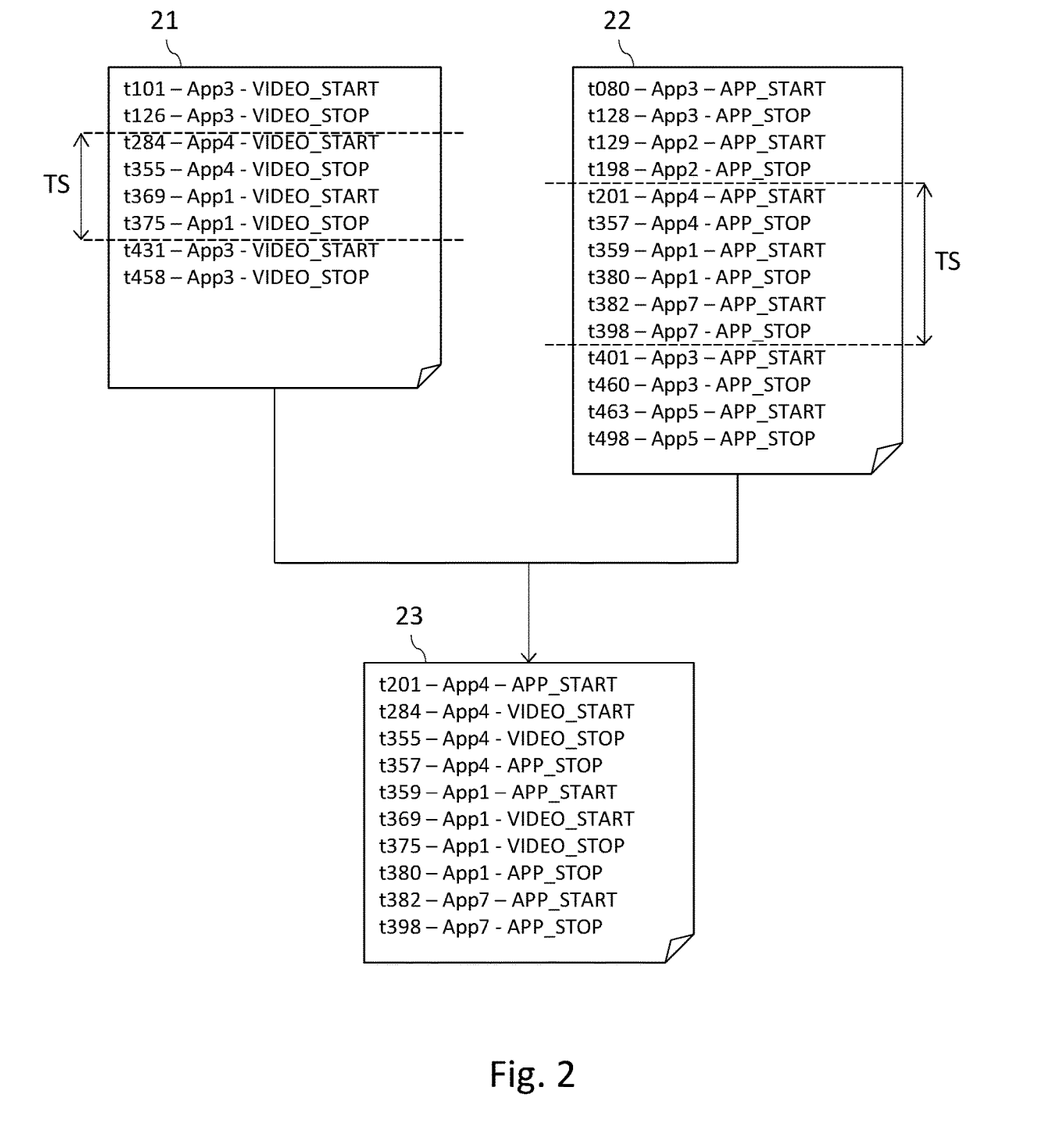
FIG. 2 shows on an example how the proposed technique is used to obtain a consolidated set of ordered events providing valuable information regarding applications usage, according to an embodiment of the present disclosure.

FIG. 2 illustrates one example how a set of video events 21 and a set of application events 22 are filtered with respect to a past time slot TS (for example past time slot starting at timestamp t200 and finishing at timestamp t400), and then merged to deliver a consolidated set of ordered events 23.

As it can be seen from this example, events may be of four types: application start event (APP_START), application stop event (APP_STOP), video start event (VIDEO_START), and video stop event (VIDEO_STOP). Each event is associated with a corresponding timestamp and a corresponding application. It should also be noted that events may usually be gathered by pair: pairs formed by an application start event and an application stop event on one hand (for example the pair formed by APP_START at timestamp t382 and APP_STOP at timestamp t398 in the consolidated set of ordered events 23, regarding application App7), and pairs formed by an video start event and an video stop event on the other hand (for example the pair formed by VIDEO_START at timestamp t284 and VIDEO_STOP at timestamp t355 in the consolidated set of ordered events 23, regarding a video played in application App4).

The example previously described in relation with FIG. 2 illustrates a nominal situation, wherein all pairs of events (as previously described) are well formed in the consolidated set of ordered events. However, for various reasons, it may not be always the case in practice. For example, since statistics update is not a crucial point in the global operating system life cycle, the accuracy of the usage statistics provided by the usage statistics API may be perfectible. It may also happen that the operating system has to put in foreground and in background the same application several times in a short time, due to system constraints. As the determination of video events also relies on the use of the usage statistics API (to identify a current application), some inaccuracy may also eventually be observed in the set of video events. As a result, duplicated events may be witnessed for both application events and video events, as illustrated on the example of consolidated set of ordered events 31 shown on FIG. 3.

Figure 3:
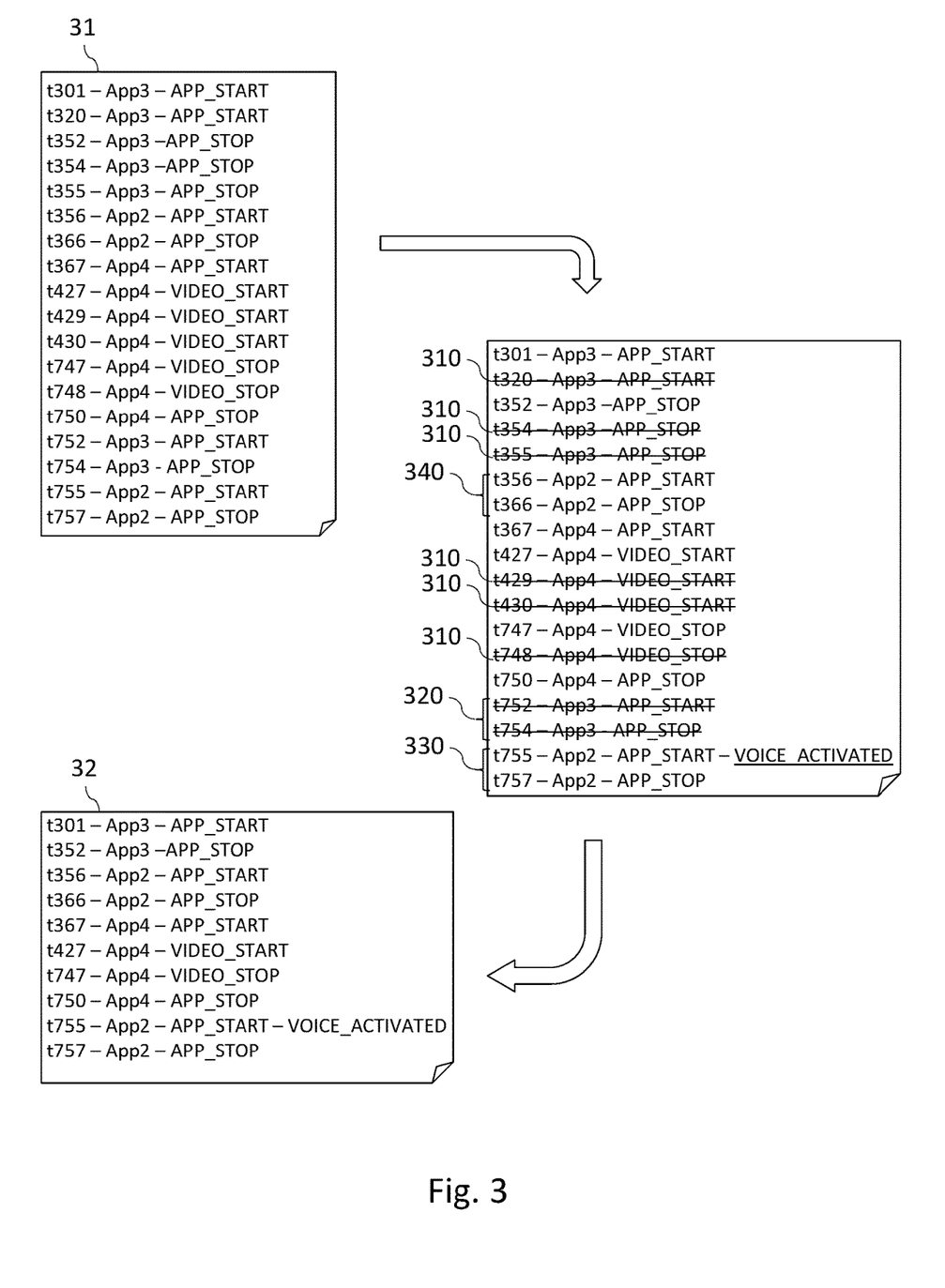
FIG. 3 shows various mechanisms allowing cleaning up of a consolidated set of ordered events, according to an embodiment of the present disclosure.

Thus, according to some embodiments, various mechanisms described hereafter are proposed to clean up the consolidated set of ordered events 31.

According to one embodiment, the proposed technique comprises removing successive duplicated events of a same type from the consolidated set of ordered events. By successive duplicated events of a same type, it is meant here the events that are of the same type of a given event, that are associated with the same application than the one associated with this given event, and that form a chain (of one or more events) following immediately that given event in the consolidated set or ordered event. For example, referring to FIG. 3, the two APP_STOP events associated with application App3 at timestamps t354 and t355 are successive duplicated events of the APP_STOP event associated with application App3 at timestamps t352. Thus, these events are removed from the consolidated set or ordered event, along with all the other successive duplicated events (numbered 310 on FIG. 3).

According to one embodiment, the proposed technique further comprises removing a pair formed by an application start event and an application stop event from the consolidated set of ordered events, when the time duration separating said application start event and said application stop event is below a predetermined threshold, for example three seconds. Such pairs of application events may indeed be considered as parasite events or noise, as they define a time interval that is too short to be representative of a real use of the application. However, according to a particular feature, such a removal may be performed only if the application associated with said pair of application events is absent from a predetermined list of applications. In that way, the predetermined list may be used to identify some specific applications for which even a very short usage time is considered as pertinent. For example, the usage time of a search engine application such as the application Katniss running on an Android operating system may be very short (e.g. less than three seconds), especially when the search engine application is used to perform a vocal search. Indeed, pronouncing the keywords to be searched is usually far more faster than writing them. Such a search engine application may thus be added to the above-mentioned predetermined list of applications. For example, referring back to FIG. 3, and assuming that application App3 is not present in such a predetermined list of applications, the pair 320 of APP_START-APP_STOP events associated with App3 is removed from the consolidated set of ordered events, since the time interval between timestamps t752 and t754 is below a predetermined threshold, for example three seconds. However, assuming that application App2 is present in such a list (for example because App2 is known as being a search engine application), the pair 330 of APP_START-APP_STOP events associated with application App2 is kept (i.e. not removed) in the consolidated set of ordered events, although the time interval between timestamps t755 and t757 is also below the predetermined threshold of three seconds. According to particular feature, a flag may even be added to such a pair 330 in the consolidated set of ordered events. For example, as illustrated in FIG. 3, the flag "VOICE_ACTIVATED" is added to the pair 330 of APP_START-APP_STOP events associated with application App2. In case of App2 being a search engine application, such a feature makes it possible to differentiate a presumed vocal search (pair 330) from a presumed textual search (pair 340) within the consolidated set of ordered events.

Thanks to the above-described mechanisms, a cleaned consolidated set of ordered event 32 is finally obtained.

A consolidated set of ordered event obtained through the various embodiments previously described in the present document provides many valuable information regarding applications usage. For example, the consolidated set of ordered event 32 of FIG. 3 teaches that:
- application App3 was used between timestamps t301 and t352;
- search engine application App2 was used between timestamps t356 and t366, probably for a textual search (no flag);
- video application App4 was used between timestamps t367 and t750 with time between timestamps t367 and t427 probably dedicated to browse the video catalogue (since no video was played during that time), and time between timestamps t427 and t750 dedicated to watch a video;

search engine application App2 was used between timestamps t755 and t757, probably for a vocal search (flag VOICE ACTIVATED present).

According to an embodiment, such a consolidated set of ordered event may be transmitted to remote servers such as data warehouses, for further analysis.

According to another aspect, the present disclosure also pertains to an apparatus for monitoring usage of at least one application executed within an operating system of an electronic device, wherein said apparatus comprises at least one processor adapted and configured for:

while a processing condition is not satisfied:
determining a video event associated with a current application
storing said video event along with a corresponding video event timestamp in a data structure, delivering a set of video events;
once said processing condition is satisfied:
determining a past time slot;
calling an usage statistics API provided on said operating system, delivering a set of application events representative of whether an application has been put:
in system foreground, defining an application start event; or
in system background, defining an application stop event;
each application event being associated with a corresponding application event timestamp;
retrieving, from said set of application events and based on the application event timestamps, application events that have occurred during said past time slot;
retrieving, from said set of video events and based on the video event timestamps, video events that have occurred during said past time slot;
chronologically ordering said retrieved application and video events, based on said application and video event timestamps, delivering a consolidated set of ordered events that have occurred during said past time slot.

Such an apparatus can be especially adapted to implement the method for monitoring usage of at least one application described here above. It could of course comprise the different characteristics pertaining to the method according to an embodiment of the disclosure, which can be combined or taken separately. Thus, the characteristics and advantages of the apparatus are the same as those of the method.

Figure 4:
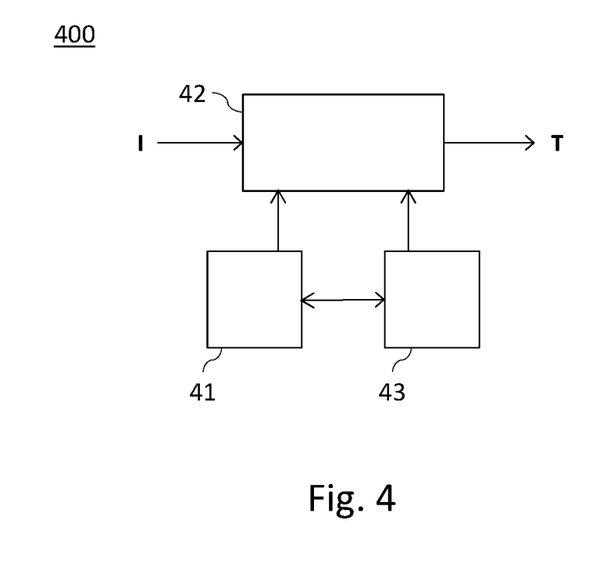
FIG. 4 is a schematic block diagram illustrating an example of an apparatus for monitoring usage of at least one application executed within an operating system of an electronic device, according to an embodiment of the present disclosure.

FIG. 4 is a schematic block diagram illustrating an example of an apparatus 400 for monitoring usage of at least one application executed within an operating system of an electronic device, according to an embodiment of the present disclosure. As previously described, the electronic device may be any device comprising an operating system providing an environment allowing various applications to be executed on the electronic device. For example, the electronic device may be a smartphone, a tablet, a computer, a set-top box, etc. In one embodiment, the apparatus 400 may be embedded in the electronic device, with possibly some shared resources. In another embodiment, it may be an external apparatus connected to or in communication with the electronic device.

The apparatus 400 has a memory 41 consisting of a buffer memory, a processing unit 42, equipped for example with a microprocessor and driven by the computer program 43 implementing at least certain steps of the method for monitoring usage of at least one application executed within an operating system of an electronic device, according to the invention.

At initialization, the code instructions of the computer program 43 are for example loaded into a RAM and then executed by a processor of the processing unit 42. The processing unit 42 inputs at least one piece of information I, such as a result of whether a processing condition is satisfied or not. The microprocessor of the processing unit 42 implements some of the steps of the method described here above, according to the instructions of the computer program 43, to deliver, as a piece of processed information T, a consolidated set of ordered events that have occurred during a past time slot. To this end, the microprocessor of the processing unit 42, is adapted and configured for:

while a processing condition is not satisfied:
determining a video event associated with a current application;
storing said video event along with a corresponding video event timestamp in a data structure, delivering a set of video events;
once said processing condition is satisfied:
determining a past time slot;
calling an usage statistics API provided on said operating system, delivering a set of application events representative of whether an application has been put:
in system foreground, defining an application start event; or
in system background, defining an application stop event;
each application event being associated with a corresponding application event timestamp;
retrieving, from said set of application events and based on the application event timestamps, application events that have occurred during said past time slot;
retrieving, from said set of video events and based on the video event timestamps, video events that have occurred during said past time slot;
chronologically ordering said retrieved application and video events, based on said application and video event timestamps, delivering a consolidated set of ordered events that have occurred during said past time slot.

Another aspect of the present disclosure pertains to at least one computer program product downloadable from a communication network and/or recorded on a medium readable by a computer and/or executable by a processor, comprising program code instructions for implementing the method as described above.

In addition, the present disclosure also concerns a non-transitory computer-readable medium comprising a computer program product recorded thereon and capable of being run by a processor, including program code instructions for implementing the method for monitoring usage of at least one application as described above.

The computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method for monitoring usage of at least one application executed within an operating system of an electronic device, the method being implemented by a monitoring application different from said at least one application, wherein the method comprises at least one iteration of:
while a processing condition is not satisfied:
determining a video event associated with a current application, said determining comprising:
identifying said current application via a call to an usage statistics API provided on said operating system, said usage statistics delivering a set of application events representative of whether an application has been put:
in system foreground, defining an application start event; or
in system background, defining an application stop event;
each application event being associated with a corresponding application event timestamp, said current application corresponding to the last application logged as being put in system foreground in said set of application events; and
determining said video event, as a function of a previous video event associated with said current application, of a current audio status, and of a current network usage status;
storing said video event along with a corresponding video event timestamp in a data structure, delivering a set of video events; and
once said processing condition is satisfied:
determining a past time slot;
calling said usage statistics API, delivering an updated set of application events
retrieving, from said updated set of application events and based on the application event timestamps, application events that have occurred during said past time slot;
retrieving, from said set of video events and based on the video event timestamps, video events that have occurred during said past time slot; and
chronologically ordering said retrieved application and video events, based on said application and video event timestamps, delivering a consolidated set of ordered events that have occurred during said past time slot.

2. The method according to claim 1, wherein said previous video event associated with said current application is retrieved from said set of video events.

3. The method according to claim 1, wherein said current audio status and/or said current network usage status are obtained via a call to at least one API provided by said operating system.

4. The method according to claim 1, wherein said current audio status and/or said current network usage status are obtained by monitoring at least one equipment of said electronic device.

5. The method according to claim 1, wherein said video event is either a video start event or a video stop event, and wherein:
said video event is a video start event, when the following conditions are met:
said previous video event is a video stop event; and
said current audio status is active; and
said network current network usage status is active;
said video event is a video stop event, when the following conditions are met:
said previous video event is a video start event; and
said current audio status is not active.

6. The method according to claim 1, wherein it further comprises removing successive duplicated events of a same type from said consolidated set of ordered events.

7. The method according to claim 1, wherein it further comprises removing, from said consolidated set of ordered events:
successive duplicated pairs formed by an application start event and an application stop event; and
successive duplicated pairs formed by a video start event and a video stop event.

8. The method according to claim 1, wherein it further comprises removing a pair formed by an application start event and an application stop event from said consolidated set of ordered events, when the following conditions are met:
time duration separating said application start event and said application stop event is below a predetermined threshold; and
application associated with said pair of events is absent from a predetermined list of applications.

9. The method according to claim 8, wherein it further comprises adding a flag to a pair formed by an application start event and an application stop event within said consolidated set of ordered events, when the following conditions are met:
time duration separating said application start event and said application stop event is below said predetermined threshold; and
application associated with said pair of events is present within said predetermined list of applications.

10. The method according to claim 1, wherein said monitoring application is a system application executed in the system background.

11. The method according to claim 1, wherein said operating system is an Android operating system.

12. An apparatus for monitoring usage of at least one application executed within an operating system of an electronic device, the apparatus comprising at least one processor configured to:
while a processing condition is not satisfied:
determine a video event associated with a current application, said video event determined by:
identifying said current application via a call to an usage statistics API provided on said operating system, said usage statistics delivering a set of application events representative of whether an application has been put:
in system foreground, defining an application start event; or
in system background, defining an application stop event;
each application event being associated with a corresponding application event timestamp, said current application corresponding to the last application logged as being put in system foreground in said set of application events; and determining said video event, as a function of a previous video event associated with said current application, of a current audio status, and of a current network usage status; and store said video event along with a corresponding video event timestamp in a data structure, delivering a set of video events; and once said processing condition is satisfied:

determine a past time slot;

call said usage statistics API, delivering an updated set of application events retrieve, from said updated set of application events and based on the application event timestamps, application events that have occurred during said past time slot;

retrieve, from said set of video events and based on the video event timestamps, video events that have occurred during said past time slot; and order, chronologically, said retrieved application and video events, based on said application and video event timestamps, delivering a consolidated set of ordered events that have occurred during said past time slot.

13. A non-transitory computer-readable medium having stored thereon a set of programming instructions that, when executed by at least one processor, performs the steps of:

while a processing condition is not satisfied:

determining a video event associated with a current application, said determining comprising:

identifying said current application via a call to an usage statistics API provided on said operating system, said usage statistics delivering a set of application events representative of whether an application has been put:

in system foreground, defining an application start event; or in system background, defining an application stop event;

each application event being associated with a corresponding application event timestamp, said current application corresponding to the last application logged as being put in system foreground in said set of application events; and determining said video event, as a function of a previous video event associated with said current application, of a current audio status, and of a current network usage status; and storing said video event along with a corresponding video event timestamp in a data structure, delivering a set of video events; and once said processing condition is satisfied:

determining a past time slot;

calling said usage statistics API, delivering an updated set of application events;

retrieving, from said updated set of application events and based on the application event timestamps, application events that have occurred during said past time slot;

retrieving, from said set of video events and based on the video event timestamps, video events that have occurred during said past time slot;

chronologically ordering said retrieved application and video events, based on said application and video event timestamps, delivering a consolidated set of ordered events that have occurred during said past time slot.

\* \* \* \* \*